(12) United States Patent
Pinc et al.

(10) Patent No.: US 11,440,829 B2
(45) Date of Patent: Sep. 13, 2022

(54) UTILIZATION OF SULFATE IN THE FINING OF SUBMERGED COMBUSTION MELTED GLASS

(71) Applicant: Owens-Brockway Glass Container Inc., Perrysburg, OH (US)

(72) Inventors: William Pinc, Waterville, OH (US); Udaya Vempati, Ottawa, IL (US)

(73) Assignee: Owens-Brockway Glass Container Inc., Perrysburg, OH (US)

(*) Notice: Subject to any disclaimer, the term of this patent is extended or adjusted under 35 U.S.C. 154(b) by 211 days.

(21) Appl. No.: 16/590,079

(22) Filed: Oct. 1, 2019

(65) Prior Publication Data

US 2021/0094860 A1    Apr. 1, 2021

(51) Int. Cl.
| | |
|---|---|
| *C03B 5/235* | (2006.01) |
| *C03B 5/225* | (2006.01) |
| *C03B 5/24* | (2006.01) |
| *C03C 1/00* | (2006.01) |
| *C03C 3/078* | (2006.01) |

(52) U.S. Cl.
CPC ............ *C03B 5/225* (2013.01); *C03B 5/2353* (2013.01); *C03B 5/2356* (2013.01); *C03B 5/24* (2013.01); *C03C 1/004* (2013.01); *C03C 3/078* (2013.01); *C03B 2211/23* (2013.01)

(58) Field of Classification Search
CPC .......... C03B 5/2356; C03B 5/225; C03B 5/24
See application file for complete search history.

(56) References Cited

U.S. PATENT DOCUMENTS

| | | | | |
|---|---|---|---|---|
| 2,773,111 | A | * 12/1956 | Arbeit | ..................... C03B 5/225 373/31 |
| 3,475,151 | A | * 10/1969 | Spatz | ................. G05D 23/1925 65/162 |
| 3,917,539 | A | 11/1975 | Deeg et al. | |

(Continued)

FOREIGN PATENT DOCUMENTS

| | | |
|---|---|---|
| CN | 105948467 A | 9/2016 |
| WO | WO-2017035174 A1 * | 3/2017 ............... C03B 7/07 |

OTHER PUBLICATIONS

International Search Report and Written Opinion, Int. Application No. PCT/US2020/053403, Int. Filing Date: Sep. 30, 2020, Applicant: Owens-Brockway Glass Container Inc., dated Dec. 10, 2020.

*Primary Examiner* — Jodi C Franklin

(57) ABSTRACT

A method of producing and fining glass includes monitoring a temperature of a molten glass bath contained within a fining chamber of a fining vessel and, based on the monitored temperature, controlling an amount of a sulfate chemical fining agent added into a glass melt contained within an interior reaction chamber of an upstream submerged combustion melter that feeds the fining vessel. The temperature of the molten glass bath may be determined within a temperature indication zone that encompasses a subsurface portion of the molten glass bath that lies adjacent to a floor of a housing of the fining vessel. By monitoring the temperature of the molten glass bath and controlling the amount of the sulfate chemical fining agent added to the glass melt of the submerged combustion melter, the wasteful use of the sulfate chemical fining agent can be minimized and the fining process rendered more efficient.

44 Claims, 6 Drawing Sheets

(56) References Cited

U.S. PATENT DOCUMENTS

| | | | | |
|---|---|---|---|---|
| 4,028,083 A * | 6/1977 | Patznick | C03B 5/24 | 65/29.21 |
| 4,632,687 A * | 12/1986 | Kunkle | C03B 5/14 | 65/335 |
| 4,693,740 A * | 9/1987 | Noiret | C03B 5/031 | 65/135.1 |
| 5,665,137 A * | 9/1997 | Huang | C03B 5/193 | 65/134.1 |
| 5,922,097 A * | 7/1999 | Kobayashi | C03B 5/225 | 65/134.1 |
| 6,460,376 B1 * | 10/2002 | Jeanvoine | C03B 5/20 | 65/134.2 |
| 6,470,710 B1 | 10/2002 | Takei et al. | | |
| 6,698,244 B1 * | 3/2004 | Romer | C03C 3/085 | 65/135.2 |
| 7,578,988 B2 | 8/2009 | Jacques et al. | | |
| 8,196,432 B2 * | 6/2012 | Jacques | C03C 3/064 | 65/134.1 |
| 9,227,865 B2 * | 1/2016 | Shock | C03B 5/20 | |
| 9,352,994 B2 | 5/2016 | Maehara et al. | | |
| 10,807,896 B2 * | 10/2020 | Wang | C03C 1/004 | |
| 2002/0162358 A1 * | 11/2002 | Jeanvoine | C03B 5/2356 | 65/135.1 |
| 2004/0168474 A1 * | 9/2004 | Jeanvoine | C03C 3/087 | 65/121 |
| 2004/0168475 A1 * | 9/2004 | Jeanvoine | C03B 5/12 | 65/178 |
| 2004/0224833 A1 * | 11/2004 | Jeanvoine | C03C 3/087 | 501/70 |
| 2005/0056058 A1 * | 3/2005 | Jeanvoine | C03B 5/2356 | 65/134.5 |
| 2006/0105899 A1 * | 5/2006 | Jacques | C03B 5/12 | 501/56 |
| 2007/0022780 A1 * | 2/2007 | House | C03B 5/193 | 65/29.21 |
| 2007/0122332 A1 * | 5/2007 | Jacques | C03C 1/02 | 423/334 |
| 2009/0277227 A1 | 11/2009 | Pedeboscq et al. | | |
| 2010/0064732 A1 * | 3/2010 | Jeanvoine | C03B 5/04 | 65/146 |
| 2011/0302962 A1 * | 12/2011 | Gattermann | C03C 3/087 | 65/29.21 |
| 2012/0125050 A1 * | 5/2012 | Murakami | C03B 5/16 | 65/90 |
| 2013/0072371 A1 | 3/2013 | Jansen et al. | | |
| 2013/0239618 A1 * | 9/2013 | Ishikawa | C03B 5/173 | 65/347 |
| 2014/0090421 A1 | 4/2014 | Shock et al. | | |
| 2014/0090423 A1 * | 4/2014 | Charbonneau | C03B 5/173 | 65/134.5 |
| 2014/0144185 A1 * | 5/2014 | Shock | C03B 5/225 | 65/134.9 |
| 2014/0356608 A1 * | 12/2014 | Lentes | C03C 3/087 | 501/64 |
| 2015/0353405 A1 * | 12/2015 | Gullinkala | C03B 5/2257 | 65/134.2 |
| 2017/0073262 A1 * | 3/2017 | Charbonneau | C03B 5/205 | |
| 2017/0096358 A1 * | 4/2017 | Martin | C03B 5/24 | |
| 2017/0259311 A1 * | 9/2017 | Benichou | F23G 5/085 | |
| 2018/0237323 A1 * | 8/2018 | D'Agostini | F23N 5/003 | |
| 2018/0273416 A1 * | 9/2018 | Demirbas | C03C 3/091 | |
| 2019/0284076 A1 * | 9/2019 | Wang | C03B 5/207 | |
| 2019/0284079 A1 * | 9/2019 | Wang | C03B 5/262 | |
| 2020/0199012 A1 * | 6/2020 | Hayashi | C03C 3/087 | |
| 2021/0094859 A1 * | 4/2021 | Wang | C03B 5/225 | |
| 2021/0246060 A1 * | 8/2021 | Vempati | C03B 5/24 | |
| 2021/0246062 A1 * | 8/2021 | Vempati | C03C 3/087 | |

* cited by examiner

UTILIZATION OF SULFATE IN THE FINING OF SUBMERGED COMBUSTION MELTED GLASS

The present disclosure is directed to glass manufacturing and, more specifically, to techniques for fining glass produced using submerged combustion melting technology.

BACKGROUND

Glass is a rigid amorphous solid that has numerous applications. Soda-lime-silica glass, for example, is used extensively to manufacture flat glass articles including windows, hollow glass articles including containers such as bottles and jars, and also tableware and other specialty articles. Soda-lime-silica glass comprises a disordered and spatially crosslinked ternary oxide network of $SiO_2$—$Na_2O$—$CaO$. The silica component ($SiO_2$) is the largest oxide by weight and constitutes the primary network forming material of soda-lime-silica glass. The $Na_2O$ component functions as a fluxing agent that reduces the melting, softening, and glass transition temperatures of the glass, as compared to pure silica glass, and the CaO component functions as a stabilizer that improves certain physical and chemical properties of the glass including its hardness and chemical resistance. The inclusion of $Na_2O$ and CaO in the chemistry of soda-lime-silica glass renders the commercial manufacture of that type of glass more practical and less energy intensive than pure silica glass while yielding acceptable glass properties. Soda-lime-silica glass, in general and based on the total weight of the glass, has a glass chemical composition that includes 60 wt % to 80 wt % $SiO_2$, 8 wt % to 18 wt % $Na_2O$, and 5 wt % to 15 wt % CaO.

In addition to $SiO_2$, $Na_2O$, and CaO, the glass chemical composition of soda-lime-silica glass may include other oxide and non-oxide materials that act as network formers, network modifiers, colorants, decolorants, redox agents, or other agents that affect the properties of the final glass. Some examples of these additional materials include aluminum oxide ($Al_2O_3$), magnesium oxide (MgO), potassium oxide ($K_2O$), carbon, sulfates, nitrates, fluorines, chlorines, and/or elemental or oxide forms of one or more of iron, arsenic, antimony, selenium, chromium, barium, manganese, cobalt, nickel, sulfur, vanadium, titanium, lead, copper, niobium, molybdenum, lithium, silver, strontium, cadmium, indium, tin, gold, cerium, praseodymium, neodymium, europium, gadolinium, erbium, and uranium. Aluminum oxide is one of the more commonly included materials—typically present in an amount up to 2 wt % based on the total weight of the glass—because of its ability to improve the chemical durability of the glass and to reduce the likelihood of devitrification. Regardless of what other oxide and/or non-oxide materials are present in the soda-lime-silica glass besides $SiO_2$, $Na_2O$, and CaO, the sum total of those additional materials is preferably 10 wt % or less, or more narrowly 5 wt % or less, based on the total weight of the soda-lime-silica glass.

The manufacture of glass involves melting a vitrifiable feedstock material (sometimes referred to as a glass batch) in a furnace or melter within a larger volume of molten glass. The vitrifiable feedstock material may include virgin raw materials, recycled glass (i.e., cullet), glass precursor oxides, etc., in proportions that result in glass having a certain glass composition upon the melting and reacting of the feedstock material. Submerged combustion (SC) melting is a melting technology that can produce glass and has recently gained interest as a potentially viable option for commercial glass manufacturing. Contrary to conventional melting practices, in which molten glass is heated primarily with radiant heat from overhead non-submerged burners, SC melting involves injecting a combustible gas mixture that contains fuel and an oxidant directly into a glass melt though submerged burners mounted in the floor or in an immersed portion of the sidewalls of a SC melter housing. The combustible gas mixture autoignites and the resultant combustion products cause vigorous stirring and turbulence as they are discharged through the glass melt. The intense shearing forces experienced between the combustion products and the glass melt cause rapid heat transfer and particle dissolution throughout the molten glass compared to the slower kinetics of a conventional melting furnace.

When the vitrifiable feedstock material is melted into glass, gas bubbles of various sizes are typically produced and become entrained within the glass. The quantity of gas bubbles of all sizes may need to be reduced to satisfy commercial specifications for "bubble free" glass. The removal of gas bubbles—a process known as "fining"—may be warranted for various reasons including the visual appearance of the glass when cooled and formed into a finished commercial article such as a glass container, flat glass product, or tableware. For SC-produced molten glass, fining has typically been accomplished by heating the glass with overhead burners in a fining vessel positioned downstream of the SC melter to achieve a certain glass viscosity and/or by adding a fining agent into the glass. A fining agent is chemical compound that reacts within the glass at elevated temperatures to release fining gases such as $O_2$, $SO_2$, and/or possibly others, which, in turn, eradicate already-present gas bubbles that result from melting of the glass-forming materials included in the vitrifiable feedstock material.

While SC melting technology can melt and integrate the vitrifiable feedstock material into the glass melt relatively quickly, thus resulting in relatively low glass residence times compared to conventional glass melting practices, the process of fining SC-produced molten glass presents several unique challenges that are not encountered when fining molten glass produced in a conventional furnace. For example, the molten glass produced in a SC melter tends to be foamy and have a relatively low density despite being chemically homogenized when discharged from the SC melter. The large quantity of homogeneously distributed bubbles may quickly form a surface layer of foam when the molten glass settles in a downstream fining chamber of a fining vessel. The surface foam layer can be thick enough that it insulates the underlying molten glass from the atmosphere above the molten glass bath. When an insulating layer of foam is present, it can be difficult to transfer the amount of heat into the glass that is needed to achieve the glass viscosity at which the rate of bubble ascension through the glass is adequate. Additionally, the direct firing of combustion products into the glass melt within the SC melter tends to cause more pronounced volatization of volatile compounds. As a result, a greater amount of volatile compounds, including some fining agents, e.g., sulfates, may have to be added to the glass melt to ensure certain levels of those compounds are retained in the molten glass discharged from the SC melter. This can complicate the vitrifiable feedstock material mixing process, increase raw material costs, and intensify the amount of volatized exhaust gases emitted from the SC melter that may have to be recycled, treated, or otherwise managed as part of the overall glass-making operation.

SUMMARY OF THE DISCOURSE

The present disclosure relates to a method for producing and fining molten while optimizing the amount of a sulfate chemical fining agent added to the glass. In particular, it has been determined that a sulfate chemical fining agent has a negligible impact on the rate of bubble removal from SC-produced molten glass at or above a certain glass temperature referred to herein as the "minimum glass fining temperature." Above the minimum glass fining temperature—the setting of which may depend on where exactly the temperature of the glass is measured—the ascension of bubbles within the glass is governed primarily by the viscosity of the glass; that is, the temperature of the glass and its corresponding viscosity plays a more overarching role in increasing the rate of bubble rise through the glass than does the activity of a sulfate chemical fining agent. In that regard, the temperature of the molten glass bath contained within a fining chamber of a fining vessel, which receives an inflow of unrefined molten glass from a SC melter, is monitored. Based on the monitored temperature of the molten glass bath and its comparison against the minimum glass fining temperature, the amount of a sulfate chemical fining agent added to the glass melt within the upstream SC melter is controlled.

The amount of the sulfate chemical fining agent added to the glass melt can be controlled in various ways depending on the monitored temperature of the molten glass bath in the fining vessel. For instance, if the temperature of the molten glass bath does not exceed the minimum glass fining temperature, a sulfate chemical fining agent is added to the glass melt in an amount that ensures at least a minimum retained sulfate content is achieved in the unrefined molten glass discharged from the SC melter to boost fining in the fining vessel. Conversely, if the temperature of the molten glass bath equals or exceeds the minimum glass fining temperature, the addition of the sulfate chemical fining agent into the glass melt may be suspended or the sulfate chemical fining agent may be added in a limited amount as needed for some other purpose—such as adjusting the glass redox or promoting a certain coloration (e.g., amber glass)—while making no additional contribution for fining. The amount of the sulfate chemical fining agent added to the glass melt can be adjusted as needed over time based on the monitored temperature of the molten glass bath in the fining vessel. As a result of coordinating the addition of the sulfate fining agent into the glass melt with the conditions of the molten glass that are indicative of whether chemical fining activity will be effective, a more optimized use of the sulfate fining agent that minimizes wasteful overuse can be realized.

The present disclosure embodies a number of aspects that can be implemented separately from or in combination with each other to provide a method for producing glass. According to one embodiment of the present disclosure, a method of producing and fining glass includes several steps. One step of the method involves introducing a vitrifiable feedstock material into a glass melt contained within an interior reaction chamber of a submerged combustion melter. The vitrifiable feedstock material comprises glass-forming materials that melt-react to form glass having a disordered oxide-based network. Another step of the method involves discharging unrefined molten glass from the interior reaction chamber of the submerged combustion melter and delivering an inflow of unrefined molten glass into a fining chamber of a fining vessel. The unrefined molten glass merges with a molten glass bath contained within the fining chamber. Yet another step of the method involves monitoring a temperature of the molten glass bath within the fining chamber. And still another step of the method involves controlling an amount of a sulfate chemical fining agent added to the glass melt in the submerged combustion melter based on the temperature of the molten glass bath within the fining chamber.

According to another aspect of the present disclosure, a method of producing and fining glass includes several steps. One step involves introducing a vitrifiable feedstock material into a glass melt contained within an interior reaction chamber of a submerged combustion melter. The vitrifiable feedstock material comprises glass-forming materials that melt-react within the glass melt to form glass having a soda-lime-silica glass composition that includes 60 wt % to 80 wt % $SiO_2$, 8 wt % to 18 wt % $Na_2O$, and 5 wt % to 15 wt % CaO. Another step of the method involves discharging combustion products from one or more submerged burners directly into the glass melt contained within the interior reaction chamber of the submerged combustion melter. The combustion products discharged from the one or more submerged burners agitate the glass melt. Still another step of the method involves discharging unrefined molten glass from the interior reaction chamber of the submerged combustion melter and delivering an inflow of unrefined molten glass into a fining chamber of a fining vessel. The fining chamber is defined by a housing, and the unrefined molten glass merges with a molten glass bath contained within the fining chamber. Still another step of the method involves monitoring a temperature of the molten glass bath within the fining chamber. The temperature of the molten glass bath is determined within a temperature indication zone that encompasses a subsurface portion of the molten glass bath that lies adjacent to a floor of the housing of the fining vessel. Another step of the method involves controlling an amount of a sulfate chemical fining agent added to the glass melt in the submerged combustion melter based on the temperature of the molten glass bath within the fining chamber. And still another step of the method involves discharging an outflow of refined molten glass from the fining chamber of the fining vessel. The outflow of refined molten glass has a glass density that is greater than a glass density of the inflow of unrefined molten glass received in the fining chamber of the fining vessel.

BRIEF DESCRIPTION OF THE DRAWINGS

The disclosure, together with additional objects, features, advantages, and aspects thereof, will be best understood from the following description, the appended claims, and the accompanying drawings, in which:

DETAILED DESCRIPTION

Figure 1:
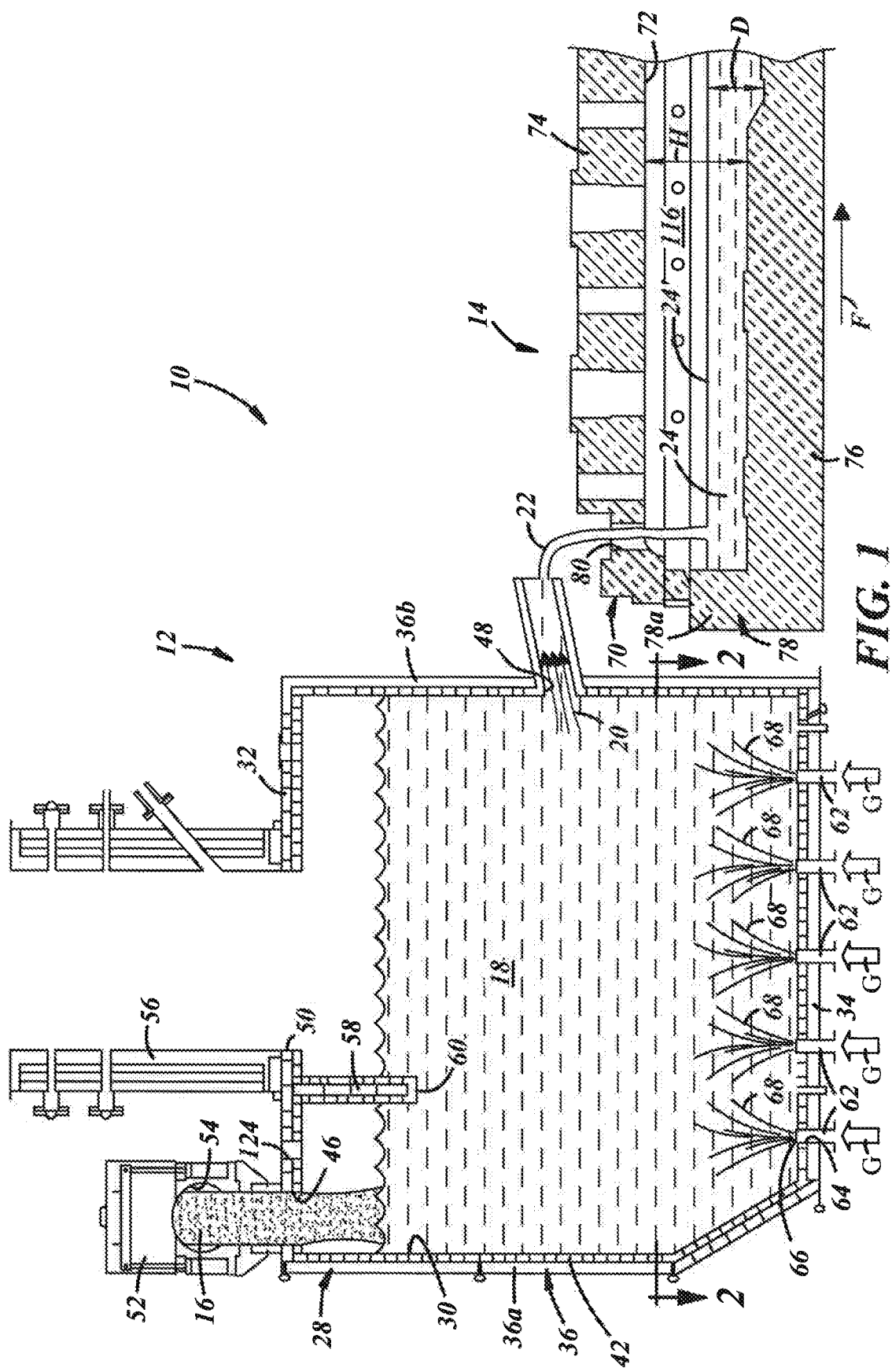
FIG. 1 is an elevated cross-sectional representation of a system that includes a submerged combustion melter and fining vessel positioned downstream of the submerged combustion melter according to one embodiment of the present disclosure.
Figure 2:
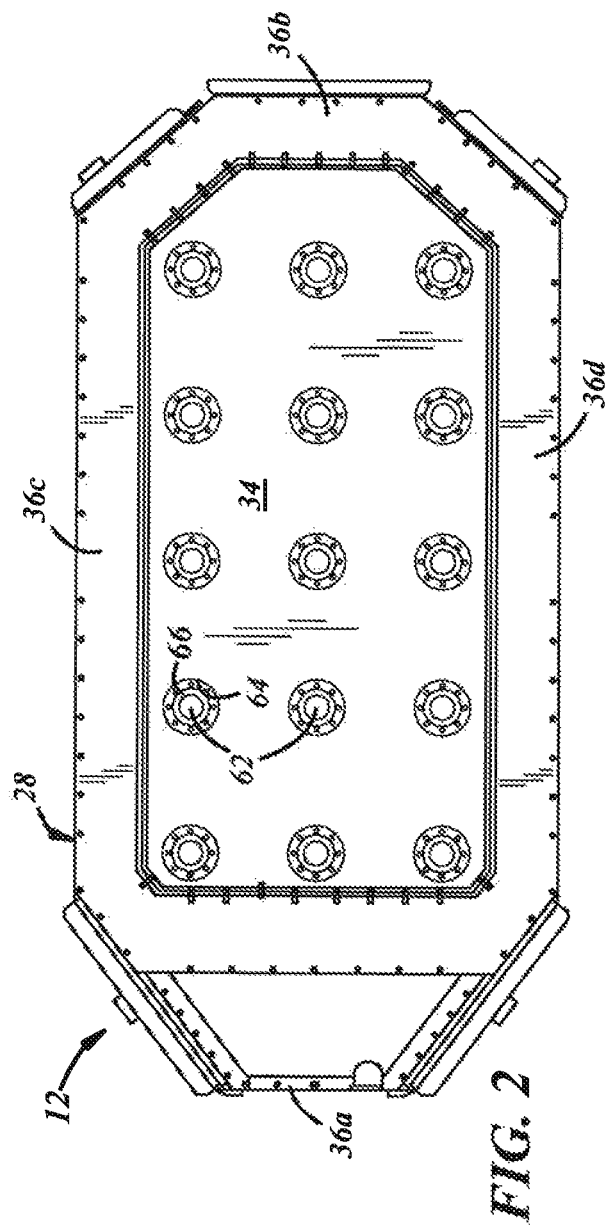
FIG. 2 is a cross-sectional plan view of the floor of the submerged combustion melter illustrated in FIG. 1 and taken along section line 2-2 according to one embodiment of the present disclosure.

The disclosed method is useful for fining molten glass produced by way of submerged combustion melting (sometimes referred to as "SC-produced molten glass"). As will be explained in further detail below, a temperature of a molten glass bath contained within a fining chamber of a fining vessel is monitored. The monitored temperature of the molten glass bath is preferably a temperature of the molten glass bath within a temperature indication zone that encompasses a subsurface portion of the molten glass bath adjacent to a floor of the housing of the fining vessel and spaced away from both an inlet end wall and an outlet end wall of the housing. The monitored temperature is compared against a minimum glass fining temperature, which is dependent on the location of the temperature indication zone, and based on that comparison, the amount of a sulfate chemical fining agent added to a glass melt contained within a submerged combustion melter positioned upstream of the fining vessel is controlled. The disclosed method is premised on the recognition that the fining of SC-produced glass is assisted by the presence of a sulfate chemical fining agent up to the minimum glass fining temperature, and that, above the minimum glass finning temperature, the sulfate chemical fining agent has no appreciable effect on fining as the viscosity of the glass is the main driving force for effective bubble removal.

Referring now to FIGS. 1-4, a glass-making system 10 is depicted that includes a submerged combustion (SC) melter 12 and a fining vessel 14. The SC melter 12 is positioned upstream of the fining vessel 14 and is fed with a vitrifiable feedstock material 16 that exhibits a glass-forming formulation. The vitrifiable feedstock material 16 is melt-reacted inside the SC melter 12 within an agitated glass melt 18 to produce molten glass having a disordered oxide-based network. Unrefined molten glass 20 drawn from the glass melt 18 is discharged from the SC melter 12 and delivered as an inflow of unrefined molten glass 22 into the fining vessel 14. The inflow of unrefined molten glass 22 combines with, and is subsumed by, a molten glass bath 24 contained within the fining vessel 14 that fines and thermally conditions the molten glass. An outflow of refined molten glass 26 is discharged from the fining vessel 14 for further processing into, for example, container or tableware or flat glass articles.

Figure 5:
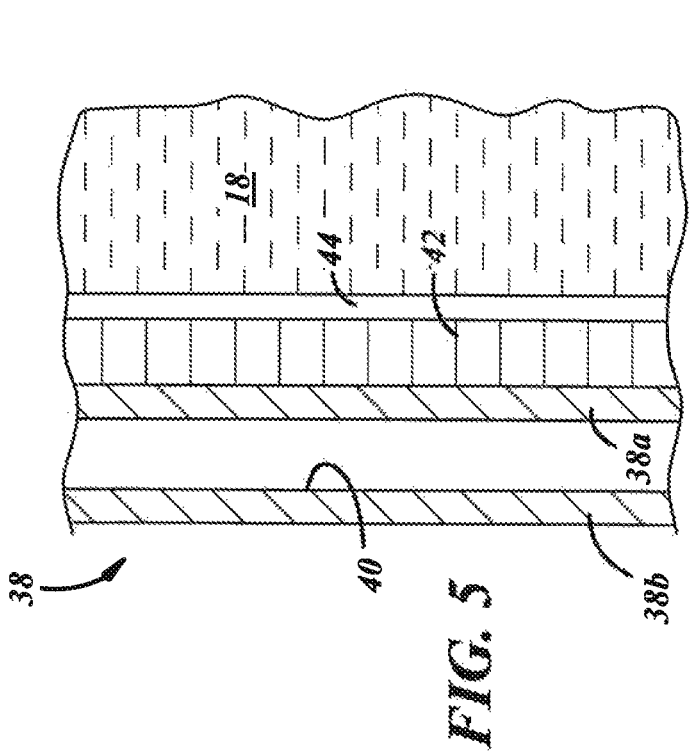
FIG. 5 is a cross-sectional illustration of a liquid cooled panel that may be used to construct some or all of the housing of the submerged combustion melter according to one embodiment of the present disclosure.

The SC melter 12 includes a housing 28 that defines an interior reaction chamber 30. The interior reaction chamber 30 defined by the housing 28 holds and contains the glass melt 18 when the SC melter 12 is operational. The housing 28 has a roof 32, a floor 34, and a surrounding upstanding wall 36 that connects the roof 32 and the floor 34. The surrounding upstanding wall 36 further includes a front-end wall 36a, a rear-end wall 36b that opposes and is spaced apart from the front-end wall 36a, and two opposed lateral sidewalls 36c, 36d that connect the front-end wall 36a and the mar-end wall 36b. At least the floor 34 and the upstanding wall 36 of the housing 28, as well as the roof 32 if desired, may be constructed from one or more fluid cooled panels 38 as shown, for example, in FIG. 5. Each of the fluid cooled panels 38 may include an inner wall 38a and an outer wall 38b that together define an internal cooling space 40 through which a coolant, such as water, may be circulated. One or more baffles (not shown) may extend fully or partially between the confronting interior surfaces of the inner and outer walls 38a, 38b to direct the flow of the coolant along a desired flowpath. As a result of being liquid cooled, a glass-side refractory material layer 42 covering an exterior surface of the inner wall 38a of each liquid cooled panel 38 supports, and is covered by, a layer of frozen glass 44 that forms in-situ between an outer skin of the glass melt 18 and a surface of the glass-side refractory material layer 42. This layer of frozen glass 44, once formed, shields and effectively protects the underlying inner wall 38a from the glass melt 18. The glass-side refractory material layer 42 may be composed of AZS (i.e., alumina-zirconia-silica).

The housing 28 of the SC melter 12 defines a feed material inlet 46, a molten glass outlet 48, and an exhaust vent 50. As shown here in FIG. 1, the feed material inlet 46 may be defined in the roof 32 of the housing 28 adjacent to or a distance from the front-end wall 36a, and the molten glass outlet 48 may be defined in the rear-end wall 36b of the housing 28 adjacent to or a distance above the floor 34, although other locations for the feed material inlet 46 and the molten glass outlet 48 are certainly possible. The feed material inlet 46 provides an entrance to the interior reaction chamber 30 for the delivery of the vitrifiable feedstock material 16. A batch feeder 52 that is configured to introduce a metered amount of the vitrifiable feedstock material 16 into the interior reaction chamber 30 may be coupled to the housing 28. The batch feeder 52 may, for example, include a rotating screw (not shown) that rotates within a feed tube 54 of a slightly larger diameter that communicates with the feed material inlet 46 to deliver the vitrifiable feedstock material 16 from a feed hopper into the interior reaction chamber 30 at a controlled rate. The molten glass outlet 48 outlet provides an exit from the interior reaction chamber 30 for the discharge of the unrefined molten glass 20 out of the SC melter 12.

The exhaust vent 50 is preferably defined in the roof 32 of the housing 28 between the front-end wall 36a and the rear-end wall 36b at a location downstream from the feed material inlet 46. An exhaust duct 56 communicates with the exhaust vent 50 and is configured to remove gaseous compounds from the interior reaction chamber 30. The gaseous compounds removed through the exhaust duct 56 may be treated, recycled, or otherwise managed away from the SC melter 12 as needed. To help prevent or at least minimize the potential loss of some of the vitrifiable feedstock material 16 through the exhaust vent 50 as unintentional feed material castoff, a partition wall 58 that depends from the roof 32 of the housing 28 may be positioned between the feed material inlet 46 and the exhaust vent 50. The partition wall 58 may include a lower free end 60 that is submerged within the glass melt 18, as shown, although it may also be positioned close to, but above, the glass melt 18 in other implementations. Preferably, the partition wall 58 is constructed from a fluid-cooled panel similar to that depicted in FIG. 5.

The SC melter 12 includes one or more submerged burners 62. Each of the one or more submerged burners 62 is mounted in a port 64 defined in the floor 34 (as shown) and/or the surrounding upstanding wall 36 at a portion of the wall 36 that is immersed by the glass melt 18. Each of the submerged burner(s) 62 forcibly injects a combustible gas mixture G into the glass melt 18 through an output nozzle 66. The combustible gas mixture G comprises fuel and an oxidant such as oxygen. The fuel supplied to the submerged burner(s) 62 is preferably methane or propane, and the oxygen may be supplied as pure oxygen, in which case the burner(s) 62 are oxy-fuel burners, or it may be supplied as a component of air or an oxygen-enriched gas. Upon being injected into the glass melt 18, the combustible gas mixture G immediately autoignites to produce combustion products 68—namely, $CO_2$, CO, $H_2O$, and any uncombusted fuel, oxygen, and/or other gas compounds such as nitrogen—that are discharged into and through the glass melt 18. Anywhere from five to thirty submerged burners 62 are typically installed in the SC melter 12 although more or less burners 62 may certainly be employed depending on the size and melt capacity of the melter 12.

The fining vessel 14 is positioned downstream of the SC melter 12 and includes a housing 70 that defines a fining chamber 72. The fining chamber 72 holds and contains the molten glass bath 24. The housing 70 of the glass fining vessel 14 includes a roof 74, a floor 76, and an upstanding wall 78 that connects the roof 74 and the floor 76. The upstanding wall 78 typically includes an inlet or front-end wall 78a, an outlet or rear-end wall 78b that opposes and is spaced apart from the inlet end wall 78a, and two opposed lateral sidewalls 78c, 78d that join the inlet and outlet end walls 78a, 78b. The inlet end wall 78a and the outlet end wall 78b define a length L of the fining chamber 72 while the opposed lateral sidewalls 78c, 78d define a width W of the fining chamber 72 and the roof 74 and the floor 76 define a height H of the finning chamber 72. The housing 70 of the fining vessel 14 is constructed from a one or more refractory materials. In one particular embodiment, the floor 76 and the glass-contacting portions of the upstanding wall 78 may be formed from fused cast AZS (alumina-zirconia-silicate), bond AZS, castable AZS, high alumina, alumina-chrome, or alumina-silica type refractories. Insulating bricks and ceramic fire boards may be disposed behind these portions of the housing 70. As for the roof 74 and the superstructure (i.e., the non-glass contacting portion of the upstanding wall 78), those portions of the housing 70 may be formed from an alumina-silica refractory such as mullite.

The housing 70 defines an inlet 80 and an outlet 82. The inflow of unrefined molten glass 22 originating from the SC melter 12 is received into the fining chamber 72 through the inlet 80 and the outflow of refined molten glass 26 is discharged from the fining chamber 72 through the outlet 82. Consequently, the molten glass bath 24 flows through the fining chamber 72 in a flow direction F from the inlet 80 to the outlet 82 while being fined and thermally conditioned along the way. The inlet 80 may be defined in the roof 74 of the housing 70 proximate the inlet end wall 78a, as shown, although it may also be defined in the inlet end wall 78a or in one or both of the lateral sidewalls 78c, 78d either above or below a surface 24' of the molten glass bath 24. The inlet 80 provides an entrance to the fining chamber 72 and is in flow communication with the molten glass outlet 48 of the SC melter 12. For example, the inlet 80 of the fining vessel 14 may be fluidly coupled to the SC melter 12 or an intermediate holding tank (not shown) located between the SC melter 12 and the fining vessel 14 by a contained conduit or, in another implementation, the inlet 80 may be positioned to receive a gravity-assisted pour of the unrefined molten glass 22 from the SC melter 12 as shown here in FIG. 1. An example of an intermediate holding tank that may be fluidly positioned between the SC melter 12 and the fining vessel 14 is the stilling vessel that is disclosed in a U.S. Pub. No. 2021/0094857, which is assigned to the assignee of the present invention and is incorporated herein by reference in its entirety.

The outlet 82 of the fining vessel 14 may be defined in the outlet end wall 78b either adjacent to the floor 76, as shown, or above the floor 76 yet beneath the surface 24' of the molten glass bath 24. The outlet 82 may also be defined in the floor 76 or in one or both of the lateral sidewalls 78c, 78d beneath the surface 24' of the molten glass bath 24 and proximate the outlet end wall 78b. The outlet 82 provides an exit from the fining chamber 72 and, in the context of commercial glass container manufacturing, may be in flow communication with a spout chamber 84 of a spout 86 that is appended to the outlet end wall 78b. The spout 86 includes a spout bowl 88, which defines the spout chamber 86 along with an orifice plate 90, and further includes at least one reciprocal plunger 92. The reciprocal plunger 92 reciprocates relative to the orifice plate 90 to control the flow of accumulated refined molten glass 94 held within the spout chamber 84 through an aligned orifice 96 in the orifice plate 90 to fashion streams or runners of molten glass. These streams or runners of glass may be sheared into glass gobs of a predetermined weight that can be individually formed into glass containers upon delivery to a glass container forming machine.

Figure 6:
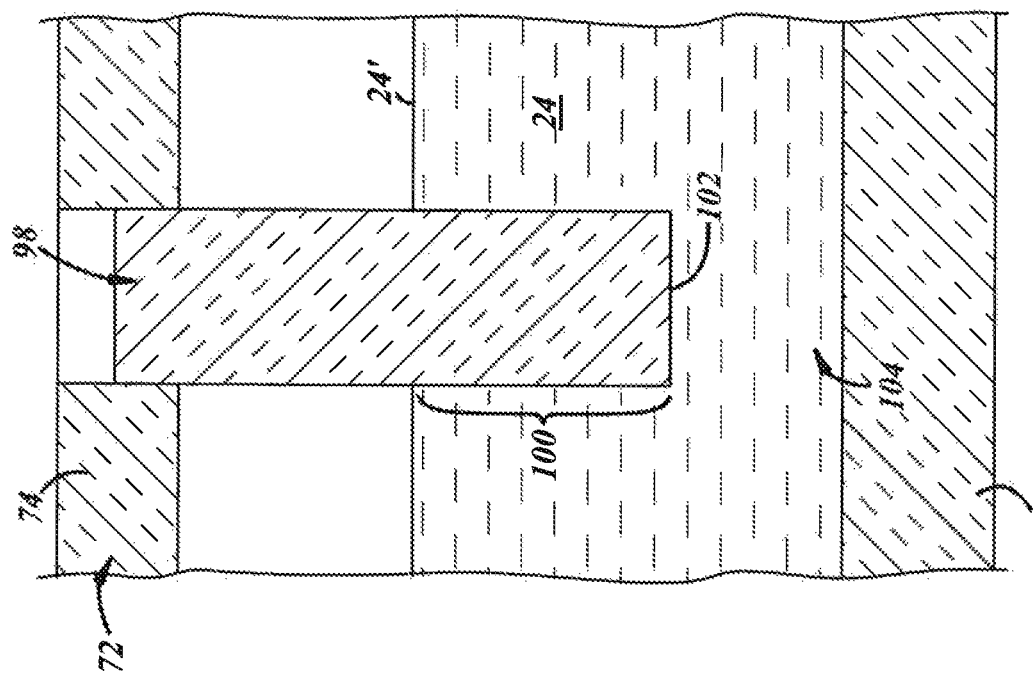
FIG. 6 is a magnified and representative cross-sectional illustration of a skimmer that may be included in the fining vessel according to one embodiment of the present disclosure.

The fining vessel 14 may include at least one skimmer 98 positioned between the inlet 80 and the outlet 82. As shown in FIG. 6, which is a representative illustration of the skimmer(s) 98 that may be present, each skimmer 98 extends downwardly from the roof 74 of the housing 72 and is partially submerged in the molten glass bath 24. A submerged portion 100 of the skimmer 98 extends across the fining chamber 72 between the lateral sidewalls 78c, 78d of the housing 72 and includes a distal free end 102 of the skimmer 98 that defines a submerged passageway 104 along with corresponding portions of the floor 76 and the sidewalls 78c, 78d. The establishment of the submerged passageway 104 causes an undercurrent of the molten glass bath 24 to flow beneath the skimmer 98 and through the submerged passageway 104 as the glass bath 24 as a whole flows along the flow direction F. As a result, the skimmer 98 blocks the less dense and more bubble-laden glass that rises to the top of the molten glass bath 24 from flowing towards the outlet 82 of the fining vessel 14. In the embodiment of the finning vessel 14 depicted here, three skimmers 98 are positioned between the inlet 80 and the outlet 82 of the finning vessel 14 in spaced relation along the flow direction F.

Relative to the flow direction F within the fining chamber 72, the three skimmers 98 of this embodiment of the finning vessel 14 include a front skimmer 98a, a rear skimmer 98c, and an intermediate skimmer 98b. The front skimmer 98a is the first skimmer 98 disposed within the fining chamber 72 along the flow direction F and the rear skimmer 98c is the last skimmer 98 disposed within the fining chamber 72 along the flow direction F. The front skimmer 98a and the inlet end wall 78a establish a receiving section 106 of the fining chamber 72, and the rear skimmer 98c and the rear end wall 78b establish a delivery section 110 of the fining chamber 72. Additionally, the front skimmer 98a and the rear skimmer 98c establish a conditioning section 108 of the fining chamber 72 between the receiving section 106 and the delivery section 110. The conditioning section 108 is further partitioned into a first upstream conditioning subsection 108a and a second downstream conditioning subsection 108b by the intermediate skimmer 98b. Additional intermediate skimmers 98b may be provided between the front and rear skimmers 98a, 98c if desired to further partition the conditioning section 108 into more conditioning subsections.

The receiving section 106 of the fining chamber 72 encompasses the inlet 80 and receives the inflow of unrefined molten glass 22, the delivery section 110 encompasses the outlet 82 and supplies the discharged outflow of refined molten glass 26, and the conditioning section 108 communicates with both the receiving and delivery sections 106, 110 of the fining chamber 72 to transition the molten glass from unrefined to refined. Consequently, the molten glass bath 24 is divided into a receiving portion 24a collected in the receiving section 106, a conditioning portion 24b collected in the conditioning section 108 including the various subsections 108a, 108b of the conditioning section 108, and a delivery portion 24c collected in the delivery section 110. Restricted flow is permitted between the various sections 106, 108, 110 in the flow direction F via the submerged passageways 104a, 104b, 104c defined underneath the skimmers 98a, 98b, 98c. In this way, the denser and less bubble-laden molten glass within the molten glass bath 24 is able to flow between the sections 106, 108, 110 of the fining chamber 72 to help ensure that the molten glass collected in the delivery section 110 meets or exceeds the minimum specifications for refined glass that is ultimately discharged from the fining vessel 14.

The housing 70 of the fining vessel 14 may also support one or more non-submerged burners 112 to provide heat to the molten glass bath 24. Each of the non-submerged burners 112 combusts a mixture of a fuel and an oxidant. The non-submerged burners 112 may include one or more sidewall burners 112a mounted in one or both of the lateral sidewalls 78c, 78d of the housing 70, one or more roof burners 112b mounted in the roof 74 of the housing 70, or both types of burners 112a, 112b. The combustion products 114a, 114b emitted from each of the burners 112a, 112b may individually be aimed into an open atmosphere 116 above the surface 24' of the molten glass bath 24, and thus do not directly impinge the molten glass bath 24, or the combustion products 114a, 114b may be aimed toward the molten glass bath 24 so that they directly impinge the surface 24' of the molten glass bath 24. Aiming the combustion products 114a, 114b into the atmosphere 116 above the molten glass bath 24 transfers heat radiantly to the pool of molten glass 24 while direct impingement between the combustion products 114a, 114b and the molten glass bath 24 transfers heat by various mechanisms including conduction and convection. Direct impingement can also reduce the volume of any foam that may accumulate, whether in a foam layer or not, on the surface 24' of the molten glass bath 24, which can help improve heat transfer efficiency into the molten glass since foam tends to act as an insulating heat barrier. Preferably, the sidewall burners 112a are pencil burners and the roof burners 112b are flat flame burners.

Figure 4:
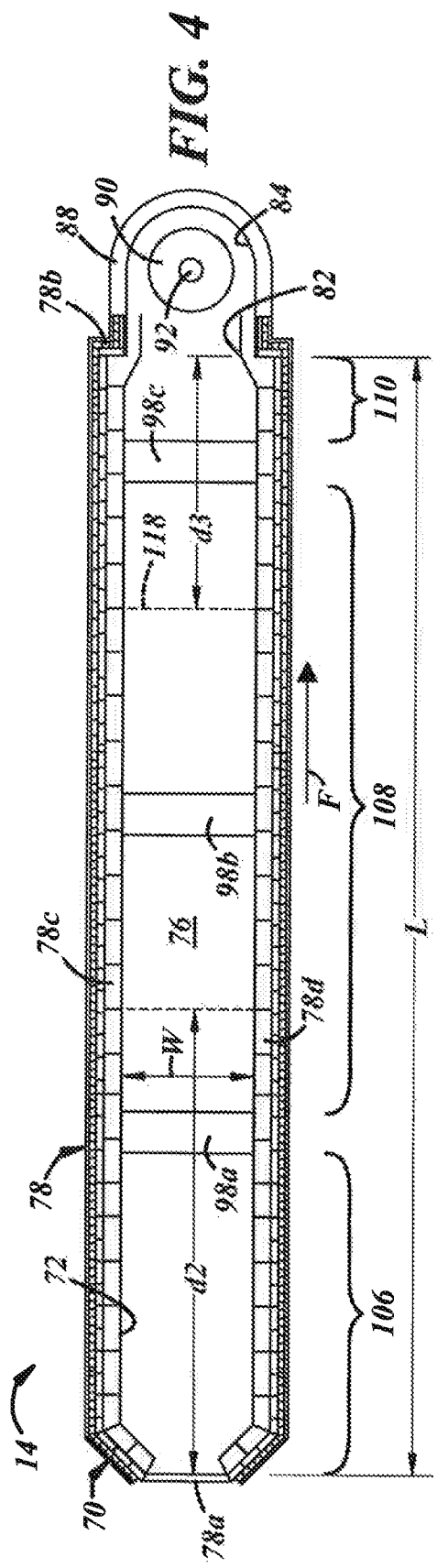
FIG. 4 is a cross-sectional plan view of the fining vessel illustrated in FIG. 3 and taken along section line 4-4 according to one embodiment of the present disclosure.
Figure 3:
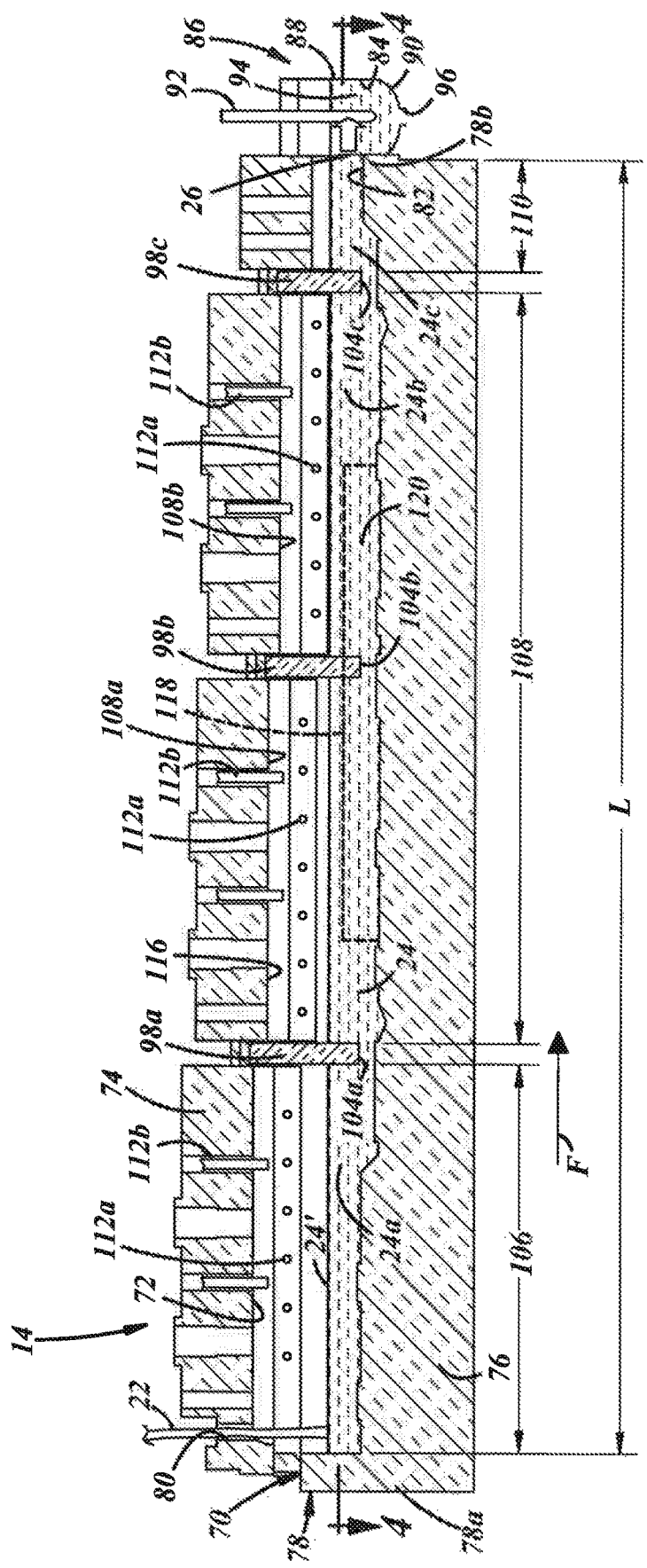
FIG. 3 is an elevated cross-sectional view of the fining vessel illustrated in FIG. 1 according to one embodiment of the present disclosure.
Figure 7:
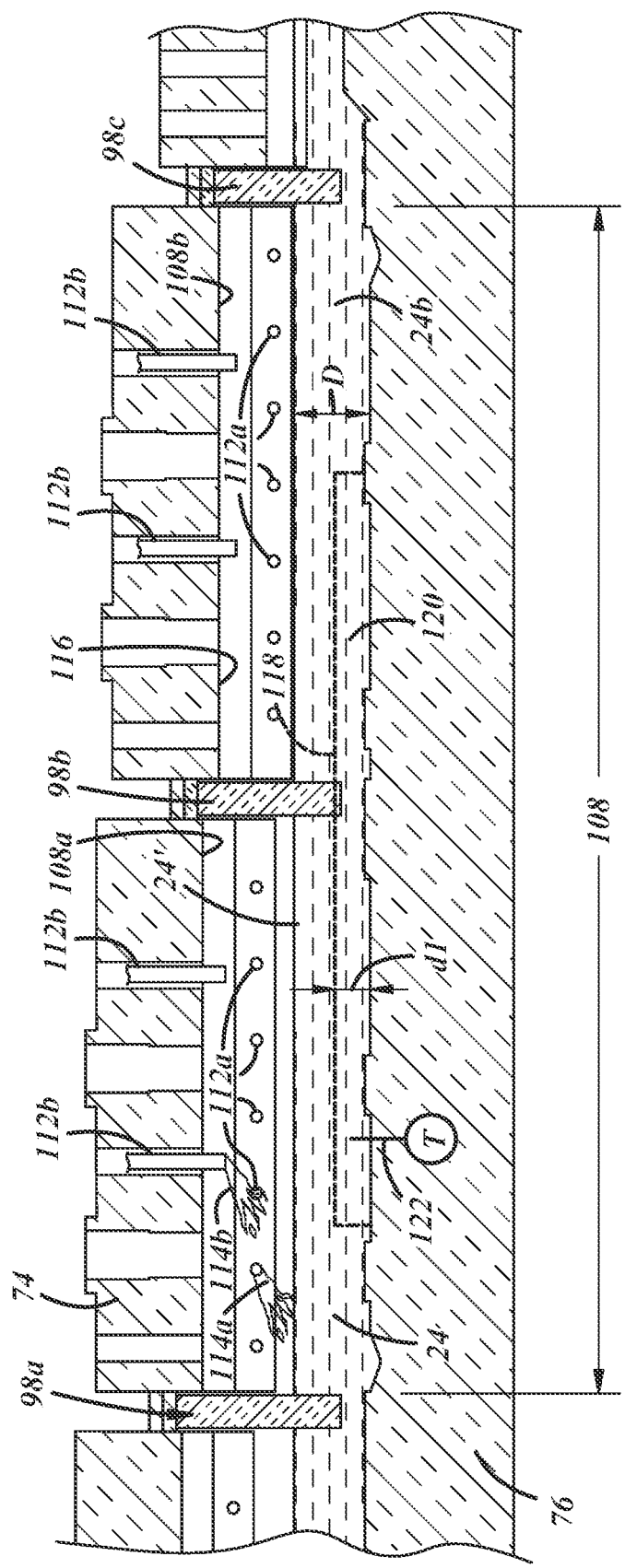
FIG. 7 is a partial cross-sectional view of the fining vessel illustrating the temperature indication zone as defined within the conditioning section of the fining chamber according to one embodiment of the present disclosure.

As part of the disclosed method, and as shown best in FIGS. 3-4 and 7, the temperature of the molten glass bath 24 is monitored over time. Such monitoring involves determining a temperature of the molten glass bath 24 within a temperature indication zone 118 that encompasses a subsurface portion 120 of the molten glass bath 24. The temperature indication zone 118 is preferably located adjacent to the floor 76 of the housing 70 of the fining vessel 14 since the deeper regions of the molten glass bath 24 are more likely to be cooler than the upper regions of the bath 24. The temperature of the molten glass bath 24 may decrease as a depth D of the molten glass bath 24 increases since the heat produced by the one or more non-submerged burners 112 may not penetrate homogeneously through the molten glass bath 24 and, thus, a declining temperature gradient may be established from the surface 24' of the molten glass bath 24 towards the bottom of the molten glass bath 24. The temperature indication zone 118 preferably rises upwards from the floor 76 of the housing 70 to distance d1 (FIG. 7) that ranges from 10% to 60% of the depth D of the molten glass bath 24 while extending the entire width W of the fining chamber 72. The temperature indication zone 118 is also preferably spaced away from the inlet end wall 78a and the outlet end wall 78b by a distance d2, d3 (FIG. 4), each of which ranges from 10% to 40% of the length L of the fining chamber 72, to better capture the thermal condition of the subsurface portion 120 of the molten glass bath 24 in and around the middle of the fining chamber 72. As such, in the embodiment shown here, the temperature indication zone 118 is defined within the conditioning section 108 of the fining chamber 72.

The temperature indication zone 118 is preferably defined to encompass the subsurface portion 120 of the molten glass bath 24 adjacent to the floor 76 of the housing 70 and away from the inlet and outlet end walls 78a, 78b of the housing 70 since that particular location most accurately links the temperature of the glass and the impact of a sulfate chemical fining agent. The temperature of the lower or deeper regions of the molten glass bath 24 is more informative than the upper or shallower regions since bubbles contained in the deeper regions of the molten glass bath 24 are more difficult to remove because (1) the glass is generally colder at the bottom of the molten glass bath 24 and (2) the bubbles have to penetrate through a greater depth (i.e., thickness) of glass to reach the surface 24' of the molten glass bath 24. Moreover, the molten glass bath 24 at the inlet end wall 78a contains a lot of bubbles and has a higher chance of being confined below a layer of foam that insulates and obstructs heat flow into the glass while the molten glass bath 24 at the outlet end wall 78b has very little room for bubbles to ascend to the surface 24' of the molten glass bath 24 before the glass is discharged from the fining vessel 14. The temperature indication zone 118 has thus been devised to focus on the more difficult-to-remove bubbles that are the target of the fining process at a location where the bubbles still have room to rise to the surface 24' of the molten glass bath 24 and burst.

The temperature of the molten glass bath 24 within the temperature indication zone 118 may be determined in a variety of ways. In one implementation, a temperature sensor 122 may be in direct contact with the subsurface portion 120 of the molten glass bath 24 in the temperature indication zone 118 to thus provide a direct measurement of the temperature therein. The temperature sensor 122 in this instance may be a thermocouple such as, for example, a platinum thimble immersion thermocouple. In another implementation, the temperature sensor 122 may be a non-contact sensor that measures the temperature of the surface 24' of the glass bath 24 above the temperature indication zone 118, which in turn can be converted through modeling or computation into the temperature of the underlying subsurface portion 120 of the molten glass bath 24 within the temperature indication zone 118. An example of a non-contact sensor that can be employed for this purpose is a radiation pyrometer. In other implementations, the temperature sensor 122 may measure the temperature of the molten glass bath 24 anywhere outside of the temperature indication zone 118, or it may measure the temperature of the surface 24' of the molten glass bath 24 at a specific point or points (not necessarily above the temperature indication zone 118), and such data may be used to determine the temperature of the molten glass bath 24 within the temperature indication zone 118 through modeling or computation. However determined, the temperature of the molten glass bath 24 within the temperature indication zone 118 is monitored over time and the temperature information is used as part of the disclosed method to control the addition of a sulfate chemical fining agent to the glass melt 18 within the SC melter 12. Other specific temperature sensors may also be employed besides the specific types mentioned above.

Referring now more specifically to FIGS. 1-4 and 7, the disclosed method is described in the context of manufacturing soda-lime-silica glass, although it should be appreciated that the same methodology may be applied to other glass chemistries as well. During operation of the SC melter 12, each of the one or more submerged burners 62 individually discharges combustion products 68 directly into and through the glass melt 18. The glass melt 18 is a volume of molten glass that often weighs between 1 US ton (1 US ton=2,000 lbs) and 100 US tons and is generally maintained at a constant volume during steady-state operation of the SC melter 12. As the combustion products 68 are thrust into and through the glass melt 18, which create complex flow patterns and severe turbulence, the glass melt 18 is vigorously agitated and experiences rapid heat transfer and intense shearing forces. The combustion products 68 eventually escape the glass melt 18 and are removed from the interior reaction chamber 30 through the exhaust vent 50 along with any other gaseous compounds that may volatize out of the glass melt 18. Additionally, in some circumstances, one or more non-submerged burners (not shown) may be mounted in the roof 32 and/or the surrounding upstanding wall 36 at a location above the glass melt 18 to provide heat to the glass melt 18, either directly by flame impingement or indirectly through radiant heat transfer, and to also facilitate foam suppression and/or destruction.

While the one or more submerged burners 62 are being fired into the glass melt 18, the vitrifiable feedstock material 16 is controllably introduced into the interior reaction chamber 30 through the feed material inlet 46. The vitrifiable feedstock material 16 does not form a batch blanket that rests on top of the glass melt 18, but, rather, is rapidly disbanded and consumed by the agitated glass melt 18. The dispersed vitrifiable feedstock material 16 is subjected to intense heat transfer and rapid particle dissolution throughout the glass melt 18 due to the vigorous melt agitation and shearing forces induced by the submerged burner(s) 62. This causes the vitrifiable feedstock material 16 to quickly mix, react, and become chemically integrated into the glass melt 18. However, the agitation and stirring of the glass melt 18 by the discharge of the combustion products 68 also promotes bubble formation within the glass melt 18. Consequently, the glass melt 18 is foamy in nature and includes a homogeneous distribution of entrained gas bubbles. The entrained gas bubbles may account for 30 vol % to 60 vol % of the glass melt 18, which renders the density of the glass melt 18 relatively low, typically ranging from 0.75 gm/cm³ to 1.5 gm/cm³, or more narrowly from 0.99 gm/cm³ to 1.3 gm/cm³, for soda-lime-silica glass. The gas bubbles entrained within the glass melt 18 vary in size and may contain any of several gases including $CO_2$, $H_2O$ (vapor), $N_2$, $SO_2$, $CH_4$, CO, and volatile organic compounds (VOCs).

The vitrifiable feedstock material 16 introduced into the interior reaction chamber 30 has a composition that is formulated to provide the glass melt 18, particularly at the molten glass outlet 48, with a predetermined glass chemical composition. The vitrifiable feedstock material 16 thus, at the very least, includes glass-forming materials that melt-react to form glass having a disordered oxide-based network. For example, the glass chemical composition of the glass melt 18 may be a soda-lime-silica glass chemical composition, in which case the glass-forming materials of the vitrifiable feed material 16 may be a physical mixture of virgin raw materials and optionally cullet (i.e., recycled glass) that provides a source of $SiO_2$, $Na_2O$, and CaO in the correct proportions along with any of the other materials listed below in Table 2 including, most commonly, $Al_2O_3$. The exact glass-forming materials included in the vitrifiable feedstock material 16 are subject to much variation while still being able to achieve the soda-lime-silica glass chemical composition as is generally well known in the glass manufacturing industry.

TABLE 2

Glass Chemical Composition of Soda-Lime-Silica Glass

| Component | Weight % | Raw Material Sources |
|---|---|---|
| $SiO_2$ | 60-80 | Quartz sand |
| $Na_2O$ | 8-18 | Soda ash |
| CaO | 5-15 | Limestone |
| $Al_2O_3$ | 0-2 | Nepheline Syenite, Feldspar |
| MgO | 0-5 | Magnesite |
| $K_2O$ | 0-3 | Potash |
| $Fe_2O_3$ + FeO | 0-0.08 | Iron is a contaminant |
| $MnO_2$ | 0-0.3 | Manganese Dioxide |
| $SO_3$ | 0-0.5 | Salt Cake, Slag |
| Se | 0-0.0005 | Selenium |
| F | 0-0.5 | Flourines are a contaminant |

For example, to achieve a soda-lime-silica glass chemical composition in the glass melt 18, the glass-forming materials of the vitrifiable feedstock material 16 may include primary virgin raw materials such as quartz sand (crystalline $SiO_2$), soda ash ($Na_2CO_3$), and limestone ($CaCO_3$) in the quantities needed to provide the requisite proportions of $SiO_2$, $Na_2O$, and CaO, respectively. Other virgin raw materials may also be included in the vitrifiable feedstock material 16 to contribute one or more of $SiO_2$, $Na_2O$, CaO, and possibly other oxide and/or non-oxide materials in the glass melt 18 depending on the desired chemistry of the soda-lime-silica glass chemical composition and the color of the glass articles being formed. These other virgin raw materials may include feldspar, dolomite, and calumite slag. The glass-forming materials of the vitrifiable feedstock material 16 may even include up to 80 wt % cullet depending on a variety of factors. In addition to the glass-forming materials, the vitrifiable feedstock material 16 may include secondary or minor materials that provide the soda-lime-silica glass chemical composition with colorants, decolorants, and/or redox agents, and in some instances may include a sulfate chemical fining agent.

The unrefined molten glass 20 discharged from the SC melter 12 through the molten glass outlet 48 is drawn from the glass melt 18 and is chemically homogenized to the desired glass chemical composition, e.g., a soda-lime-silica glass chemical composition, but with the same relatively low density and entrained volume of gas bubbles as the glass melt 18. The unrefined molten glass 20 flows into the fining vessel 14 as the inflow of unrefined molten glass 22 either directly or through an intermediate stilling or holding tank that may settle and moderate the flow rate of the inflow of unrefined molten glass 22. The inflow of unrefined molten glass 22 is introduced into the fining chamber 72 through the inlet 80 and combines with and is subsumed by the molten glass bath 24. The blending of the inflow of unrefined molten glass 22 with the molten glass bath 24 introduces the gas bubbles into the glass bath 24. As the molten glass bath 24 flows past the skimmers 98a, 98b, 98c and through the various sections 106, 108, 110 of the fining chamber 72, the portions 24a, 24b, 24c of the molten glass bath 24 become more fined as gas bubbles are removed either by ascending to the surface 24' of the molten glass bath 24 and bursting or, to a lesser extent, becoming dissolved into the glass matrix.

Ultimately, as a result of the fining process, the outflow of refined molten glass 26 drawn from the portion 24c of the molten glass bath 24 collected in the delivery section 110 of the fining chamber 72 and discharged through the outlet 82 satisfies the applicable standard for refined molten glass. Molten glass may be considered "refined" if it does not include gas bubbles having a diameter of 0.8 mm or greater (such bubbles being known as "blisters") and includes less than two bubbles per gram, or more preferably less than 0.5 bubbles per gram, of bubbles having a diameter of less than 0.8 mm (such bubbles being known as "seeds"). Additionally, for soda-lime-silica glass, the density of refined molten glass typically ranges from 2.3 $gm/cm^3$ to 2.5 $gm/cm^3$. To that end, the outflow of refined molten glass 26 exiting the fining vessel 14 (glass density of 2.3 $gm/cm^3$ to 2.5 $gm/cm^3$) has a greater density than the inflow of unrefined molten glass 20 entering the fining vessel 14 (glass density of 0.75 $gm/cm^3$ to 1.5 $gm/cm^3$) as the glass density of the molten glass bath 24 increases by 75% to 155% within the fining chamber 72 along the flow direction F from the inlet 80 to the outlet 82.

The rate at which gas bubbles rise through the molten glass bath 24, and thus the speed and efficiency of the fining process, is enhanced by attaining a suitably low viscosity of the molten glass bath 24 and/or introducing a sulfate chemical fining agent into the molten glass bath 24 via glass melt 18. By heating the molten glass bath 24 to maintain or lower the viscosity of the molten glass, the velocity at which gas bubbles rise through the molten glass bath 24 is increased according to Stokes law. Through a notably different mechanism, a sulfate chemical fining agent agent—such as sodium sulfate (salt cake)—decomposes within the glass melt 18 and the molten glass bath 24 to release $O_2$ and $SO_2$ as native-bubble scavenging fining gases. The $O_2$ and $SO_2$ fining gases that arrive in the calmer molten glass bath 24 rapidly ascend to surface 24' of the molten glass bath 24—where they ultimately exit the glass bath 24 and burst—and during their ascension sweep up or absorb smaller native gas bubbles along the way. The $O_2$ and $SO_2$ fining gases may also dissolve into the glass matrix of the molten glass bath 24 and then diffuse into the smaller native bubbles to increase the size and the buoyancy rise rate of those bubbles.

The disclosed method effectively balances thermal fining and chemical fining of the molten glass bath 24 based on a finding that there exists a temperature—referred to herein as the "minimum glass fining temperature"—at which chemical fining with a sulfate chemical fining agent no longer contributes to the overall fining process over and above the impact of thermal fining. Notably, it has been determined that a sulfate chemical fining agent has a negligible impact on the rate at which bubbles are removed from the molten glass bath 24 when the temperature of the glass bath 24 within the temperature indication zone 118 meets or exceeds a certain temperature—i.e., the minimum glass fining temperature. When the temperature of the molten glass bath 24 as determined within the temperature indication zone 118 is equal to or greater than the minimum glass fining temperature, the thermal fining mechanism predominates, and a sulfate chemical fining agent will have little or no impact on the efficiency of the fining process or the quality of the refined molten glass. Conversely, when the temperature of the molten glass bath 24 as determined within the temperature indication zone 118 is less than the minimum glass fining temperature, a sulfate chemical fining agent can have an impact on the fining of the molten glass bath 24. The "minimum glass fining temperature" of the molten glass bath 24 may be ascertained through computation, modeling, trial-and-error, or some other quantitative or experimental approach. For soda-lime-silica glass, the minimum glass fining temperature typically lies between 1220° C. to 1260° C. Indeed, a minimum glass fining temperature set at 1240° C. has been shown to be a good predictor of whether chemical fining will be worthwhile.

The temperature of the molten glass bath 24 at any location within the temperature indication zone 118 is monitored over time by the temperature sensor 122. The temperature data collected by the temperature sensor 122 is communicated to an automated and manually interactive computer system that is oftentimes observed and controlled within a control room. The temperature of the molten glass bath 24 within the temperature indication zone 118 is compared continuously or intermittently against the minimum glass fining temperature associated with the particular glass chemistry of the molten glass that constitutes the molten glass bath 24. Based on that comparison, an amount of a sulfate chemical fining agent added to the glass melt 18 within the SC melter 12 is controlled. The sulfate chemical fining agent—a term which encompasses one or more sulfate fining compounds—may be added to the glass melt 18 by being intermixed with the glass-forming materials in the vitrifiable feedstock material 16 or by being separately metered into the glass melt 18 from an auxiliary inlet 124 outfitted with dedicated metering equipment more suited for the accurate additions of smaller quantities of material relative to the quantities of the vitrifiable feedstock material 16 added through the feed material inlet 46. In some instances, the sulfate chemical fining agent may be added in part through the feed material inlet 46 (together with the glass-forming materials of the vitrifiable feedstock material 16) while also being added in part through the auxiliary inlet 24.

The amount of the sulfate chemical fining agent added to the glass melt 18 can be controlled so that the sulfate fining agent is not wasted by being unnecessarily added to the glass melt 18 when the conditions in the molten glass bath 24 indicate that chemical fining is unlikely to contribute to the overall fining process. For instance, if the temperature of the molten glass bath 24 as determined within the temperature indication zone 118 is less than the minimum glass fining temperature, the sulfate chemical fining agent may be added to the glass melt 18 to enhance fining within the molten glass bath 24 through the release of $O_2$ and $SO_2$ fining gases. The amount of the sulfate chemical fining agent added to the glass melt 18 may be calculated to provide a sulfate content as retained, that is to say dissolved, in the glass melt 18 and the unrefined molten glass 20 discharged from the SC melter 12 of at least 0.04 wt % and, more preferably, of between 0.04 wt % and 0.2 wt %, as expressed as $SO_3$.

Conversely, if the temperature of the molten glass bath 24 as determined within the temperature indication zone 118 is equal to or greater than the minimum glass fining temperature, the addition of the sulfate chemical fining agent may be suspended or stopped altogether, or a limited amount of the sulfate chemical fining agent may be added to the glass melt 18 as needed for some other purpose—such as adjusting the glass redox or promoting a certain coloration (e.g., amber glass)—apart from fining. In that case, the amount of the sulfate chemical fining agent added to the glass melt may be calculated provide a sulfate content as retained in the glass melt 18 and the unrefined molten glass 20 discharged from the SC melter 12 of less than 0.04 wt % and, more preferably, of between 0 wt % and 0.02 wt %, as expressed as $SO_3$.

Retained sulfate in the glass melt 18 and the unrefined molten glass 20 discharged from the SC melter 12 of 0.04 wt % and above may be obtained by mixing salt cake, for example, into the vitrifiable feedstock material 16 in an amount ranging from 0.05 wt % to 1.0 wt % based on the total amount of the vitrifiable feedstock material 16. On the other hand, retained sulfate in the glass melt 18 and the unrefined molten glass 20 discharged from the SC melter 12 of less than 0.04 wt % may be obtained by mixing salt cake, for example, into the vitrifiable feedstock material 16 in an amount ranging from 0 wt % to 0.05 wt % based on the total amount of the vitrifiable feedstock material 16. Of course, the amount of the sulfate fining agent added to the glass melt 18 that is needed to produce the desired retained sulfate content may vary within the ranges identified above and even outside of those ranges depending on a variety of SC melter operating conditions that also affect sulfate retention. These operating conditions include the temperature of the glass melt 18, the residence time of the glass melt 18, and the redox ratio $[(Fe^{2+}/(Fe^{2+}+Fe^{3+})]$ of the glass melt 18.

The temperature of the molten glass bath 24 within the temperature indication zone 118 may not reach the minimum glass fining temperature for any number of reasons, thus triggering the addition of a sulfate chemical fining agent into the glass melt 18 to assist the overall fining process. As explained above, when the inflow of unrefined molten glass 22 enters the fining chamber 72 through the inlet 80, the large blister-sized bubbles entrained in the glass will quickly rise to the surface 24' of the molten glass bath 24, possibly resulting in a layer of accumulated foam on top of the molten glass bath 24. The layer of foam insulates the underlying molten glass bath 24 and may prevent the penetration of heat deep into the glass bath 24 both in the receiving section 106 and possibly the conditioning section 108 of the fining chamber 72. Under these conditions, it may be difficult to heat the molten glass bath 24 sufficiently to raise the temperature of the glass bath 24 within the temperature indication zone 118 to the minimum glass fining temperature. The disclosed method can accommodate scenarios where the molten glass bath 24 cannot be heated as desired, or is not desired to be heated, such that chemical fining may be needed in addition to thermal fining to attain suitably refined molten glass, and can also manage the addition of a sulfate fining agent into the glass melt 18 based on the temperature of the molten glass bath 24 to minimize unnecessary additions of the sulfate chemical fining agent into the glass melt 18 when chemical fining is unlikely to be effective.

Figure 8:
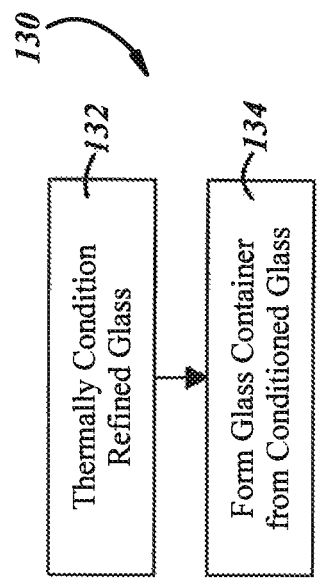
FIG. 8 is a schematic flow diagram of a process for forming glass containers from molten glass produced in a submerged combustion melter and fined in a downstream fining vessel according to one embodiment of the present disclosure.

The outflow of refined molten glass 26 discharged from the fining vessel 14 may be further processed into glass articles including, for example, glass containers. To that end, the outflow of refined molten glass 26 may have a soda-lime-silica glass chemical composition as dictated by the formulation of the vitrifiable feedstock material 16 and, in particular, the glass-forming materials included in the feedstock material 16. A process 130 for forming glass containers from the outflow of refined molten glass 26 is depicted in FIG. 8. The container forming process 130 includes a thermal conditioning step 132 and a glass container forming step 134. Under certain circumstances, the outflow of refined molten glass 26 discharged from the fining vessel 14 may already be thermally conditioned in that it exhibits the desired viscosity—that is, between 103 Pa·s and 104 Pa·s—for container forming operations. In those situations, the thermal conditioning step 132 of the process 130 as described below may be omitted.

In the thermal conditioning step 132, the outflow of refined molten glass 26 discharged from the fining vessel 14 is thermally conditioned if the viscosity of the portion 24c of the molten glass bath 24 in the delivery section 110 is too low for container forming operations. Thermal conditioning may therefore involve cooling the outflow of refined molten glass 26 at a controlled rate to achieve a glass viscosity suitable for glass forming operations while also achieving a more uniform temperature profile within the glass 126. The outflow of refined molten glass 26 is preferably cooled to a temperature between 1000° C. and 1200° C. if it is not already thermally conditioned. The thermal conditioning of the outflow of refined molten glass 26 may be performed in a forehearth that receives the outflow of refined molten glass 26 from the outlet 82 of the fining vessel 14. A forehearth is an elongated structure that defines an extended channel along which overhead and/or sidewall mounted burners can consistently and gradually reduce the temperature of the flowing refined molten glass. When a forehearth is positioned downstream of the glass fining vessel 14 to receive and thermally condition the outflow of refined molten glass 26, the spout 86 illustrated in FIGS. 3-4 may be excluded from the fining vessel 14 to permit better flow communication between the fining vessel 14 and the forehearth. The fining vessel 14 and the forehearth may be separate structures or combined into a single compartmentalized structure.

Glass containers are formed from the thermally conditioned outflow of refined molten glass 26 in the forming step 134. In some standard container-forming processes, the thermally conditioned outflow of refined molten glass 26 may be discharged from the spout 86 appended to the fining vessel 14 or a similar spout appended to the forehearth (if needed) as molten glass streams or runners. The molten glass runners are then sheared into individual gobs of a predetermined weight. Each gob is delivered via a gob delivery system into a blank mold of glass container forming machine. In other glass container forming processes, however, molten glass is streamed directly from the outlet 82 of the glass fining vessel 14 or an outlet of the forehearth (if needed) into the blank mold to fill the mold with glass. Once in the blank mold, and with its temperature still between 1000° C. and 1200° C., the molten glass is pressed or blown into a parison or preform that includes a tubular wall. The parison is then transferred by from the blank mold into a blow mold of the glass container forming machine for final shaping into a container. Once the parison is received in the blow mold, the blow mold is closed and the parison is rapidly outwardly blown into the final container shape that matches the contour of the mold cavity using a compressed gas such as compressed air. Other approaches may of course be implemented to form the glass containers besides the press-and-blow and blow-and-blow forming techniques including, for instance, compression or other molding techniques.

The glass container formed within the blow mold has an axially closed base and a circumferential wall. The circumferential wall extends from the axially closed base to a mouth that defines an opening to a containment space defined by the axially closed base and the circumferential wall. The glass container is allowed to cool while in contact with the mold walls of the blow mold and is then removed from the blow mold and placed on a conveyor or other transport device. The glass container is then reheated and cooled at a controlled rate in an annealing lehr to relax thermally-induced strain and remove internal stress points. The annealing of the glass container involves heating the glass container to a temperature above the annealing point of the soda-lime-silica glass chemical composition, which usually lies within the range of 510° C. to 550° C., followed by slowly cooling the container at a rate of 1° C./min to 10° C./min to a temperature below the strain point of the soda-lime-silica glass chemical composition, which usually lies within the range of 470° C. to 500° C. The glass container may be cooled rapidly after it has been cooled to a temperature below the strain point. Moreover, any of a variety of coatings may be applied to the surface of the glass container either before (hot-end coatings) or after (cold-end coatings) annealing for any of a variety of reasons.

EXAMPLE

An experiment was conducted to help demonstrate the relationship between the temperature of a molten glass bath, particularly when determined within a temperature indication zone as discussed above, and the contribution that chemical fining with a sulfate chemical fining agent may have on the overall fining process. In the experiment, several glass production and fining trials were run with different amounts of sulfate sources added to the vitrifiable feedstock material that was fed to the submerged combustion melter and, thus, different amounts of retained sulfate (expressed as $SO_3$) in the SC-produced molten glass. The temperature at the bottom of the molten glass bath in the temperature indication zone, which was located within the conditioning section of the fining chamber, was also varied relative to a minimum glass fining temperature of 1240° C. applicable to this experiment. The glass output from the fining vessel for each run was examined for bubble count (bubbles per gram) and plotted against the measured temperature of the molten glass bath in the fining vessel. The plot data is depicted in FIG. 9

Figure 9:
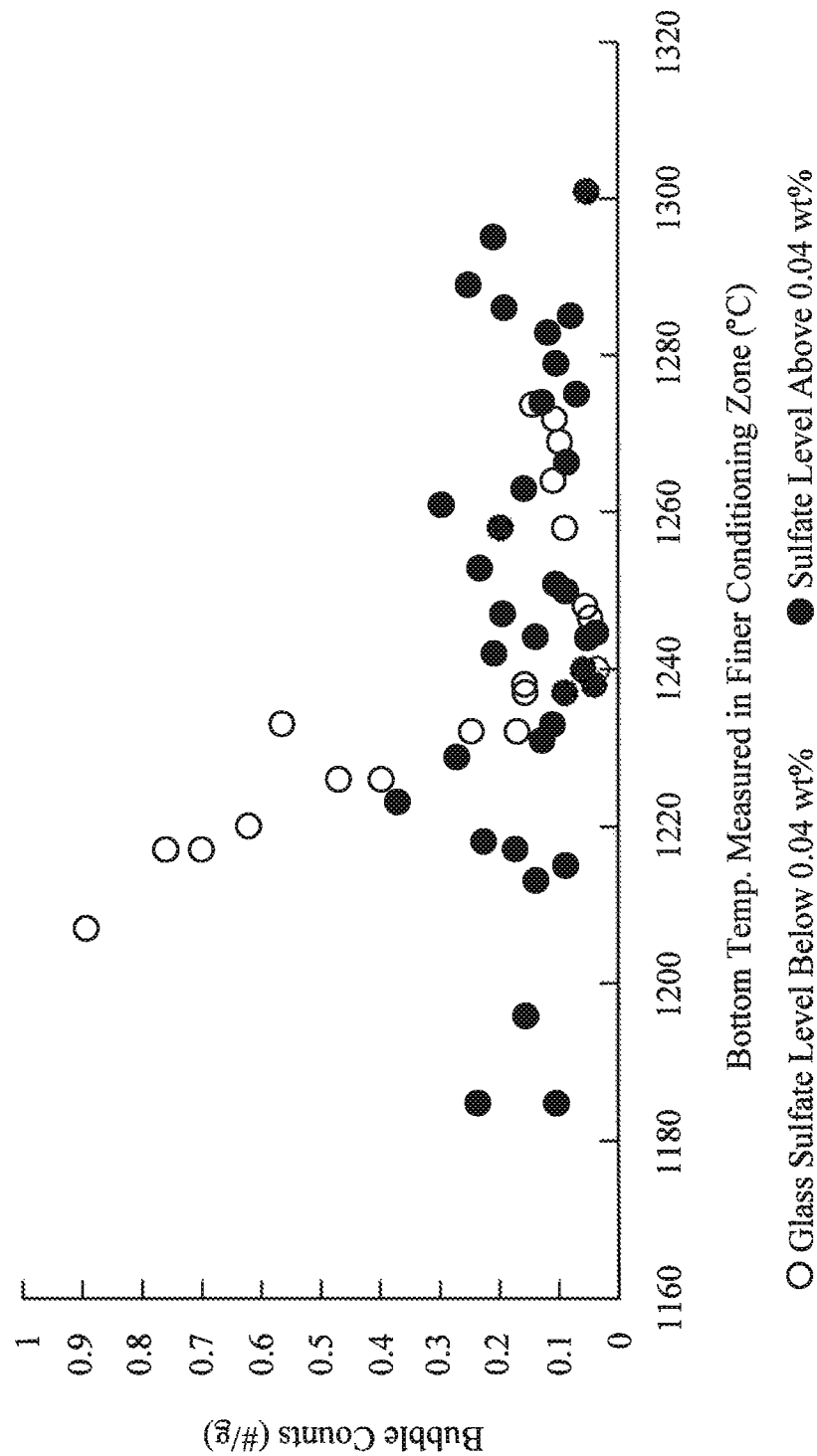
FIG. 9 is a graph that plots bubble count (number/gram) on the y-axis versus a temperature (° C.) measured at the bottom of a molten glass bath in a conditioning section of a glass fining vessel on the x-axis for various trial runs in which the glass had a retained sulfate content below 0.04 wt % (open circles) and various trial runs in which the glass had a retained sulfate content above 0.04 wt % (solid circles).

As shown in FIG. 9, the presence of greater than 0.04 wt % retained sulfate in the SC-produced molten glass (solid circles) introduced into the finer improved the fining of the glass when the temperature measured in the temperature indication zone of the molten glass bath was below 1240° C. However, when the retained sulfate content in the SC-produced glass was below 0.04 wt % (open circles) and the temperature measured in the temperature indication zone of the molten glass bath was below 1240° C., bubble counts would often exceed 0.5 seeds per gram. As such, when the temperature of the molten glass bath in the temperature indication zone was below 1240° C., increasing the amount of retained sulfate in the SC-produced molten glass coming from the submerged combustion melter to at least 0.04 wt % caused a decrease in seed counts to consistently less than 0.5 seeds per gram, even with comparable operating conditions in the fining vessel. But when the temperature measured in the temperature indication zone of the molten glass bath was above 1240° C., glass quality was maintained regardless of the retained sulfate content in the SC-produced glass.

Additionally, several glass production and fining trials were ran in which all primary sulfate sources (e.g., salt cake, sulfides, slag, and cullet, etc.) were removed from the vitrifiable feedstock material introduced into to the submerged combustion melter. Any retained sulfate that happened to be present in the SC-produced molten glass was an impurity from other materials that nonetheless measured below 0.01 wt % as expressed as $SO_3$. Despite the very low levels of retained sulfate, an observation of the fined glass revealed no blisters and seed counts consistently below 0.5 seeds per gram so long as the temperature measured in the temperature indication zone of the molten glass bath was kept above 1240° C. From the above experiment and trial runs, it can be seen that the sulfate chemical fining agent generally did not improve the rate of fining over and above that attributed to thermal fining, nor did it appreciably improve the quality of the glass, when the temperature in the bottom of the conditioning section exceeded the minimum glass fining temperature of 1240° C. that was applicable to this experiment.

There thus has been disclosed a method of producing glass using submerged combustion melting technology and fining the SC-produced molten glass that satisfies one or more of the objects and aims previously set forth. The molten glass may be further processed into glass articles including, for example, glass containers. The disclosure has been presented in conjunction with several illustrative embodiments, and additional modifications and variations have been discussed. Other modifications and variations readily will suggest themselves to persons of ordinary skill in the art in view of the foregoing discussion. For example, the subject matter of each of the embodiments is hereby incorporated by reference into each of the other embodiments, for expedience. The disclosure is intended to embrace all such modifications and variations as fall within the spirit and broad scope of the appended claims.

The invention claimed is:

1. A method of producing and fining glass, the method comprising:
   introducing a vitrifiable feedstock material into a glass melt contained within an interior reaction chamber of a submerged combustion melter, the vitrifiable feedstock material comprising glass-forming materials that melt-react into the glass melt, wherein the glass melt comprises unrefined molten glass;
   delivering an inflow of unrefined molten glass, which originates from the interior reaction chamber of the submerged combustion melter, into a fining chamber of a fining vessel, the inflow of unrefined molten glass merging with a molten glass bath contained within the fining chamber;
   monitoring a temperature of the molten glass bath within the fining chamber in a temperature indication zone of the molten glass bath that encompasses a subsurface portion of the molten glass bath;
   comparing the temperature of the molten glass bath in the temperature indication zone against a minimum glass fining temperature; and
   controlling an amount of a sulfate chemical fining agent added to the glass melt in the interior reaction chamber of the submerged combustion melter based on the comparison of the temperature of the molten glass bath in the temperature indication zone against the minimum glass fining temperature.

2. The method set forth in claim 1, further comprising:
discharging combustion products from one or more submerged burners directly into the glass melt contained within the interior reaction chamber of the submerged combustion melter, the combustion products discharged from the one or more submerged burners agitating the glass melt.

3. The method set forth in claim 1, wherein the temperature indication zone lies adjacent to a floor of a housing of the fining vessel such that the temperature indication zone extends upwards from the floor of the housing.

4. The method set forth in claim 3, wherein the temperature indication zone rises upwards from the floor of the housing to a distance ranging from 10% to 60% of a depth of the molten glass bath while extending an entire width of the fining chamber and being spaced away from each of an inlet end wall of the housing and an outlet end wall of the housing by a distance ranging from 40% to 60% of a length of the fining chamber.

5. The method set forth in claim 1, wherein the unrefined molten glass in the glass melt has a soda-lime-silica glass chemical composition, and wherein the minimum glass fining temperature is between 1220° C. and 1260° C.

6. The method set forth in claim 5, wherein the inflow of unrefined molten glass delivered into the fining chamber of the fining vessel comprises between 30 vol % and 60 vol % of entrained gas bubbles and further has a density ranging from 0.75 gm/cm$^3$ to 1.5 gm/cm$^3$, and wherein an outflow of refined molten glass discharged from the fining chamber of the fining vessel has a density ranging from 2.3 gm/cm$^3$ to 2.5 gm/cm$^3$.

7. The method set forth in claim 5, wherein controlling the amount of the sulfate chemical fining agent added to the glass melt comprises:
controlling the amount of the sulfate chemical fining agent added to the glass melt contained in the interior reaction chamber of the submerged combustion melter to provide the unrefined molten glass, upon being discharged from the submerged combustion melter, with a retained sulfate content of at least 0.04 wt %, as expressed as $SO_3$, when the temperature of the molten glass bath within the temperature indication zone is less than the minimum glass fining temperature.

8. The method set forth in claim 5, wherein controlling the amount of the sulfate chemical fining agent added to the glass melt comprises:
controlling the amount of the sulfate chemical fining agent added to the glass melt contained in the interior reaction chamber of the submerged combustion melter to provide the unrefined molten glass, upon being discharged from the submerged combustion melter, with a retained sulfate content of between 0 wt % and less than 0.04 wt %, as expressed as $SO_3$, when the temperature of the molten glass bath within the temperature indication zone is equal to or greater than the minimum glass fining temperature.

9. The method set forth in claim 8, wherein controlling the amount of the sulfate chemical fining agent added to the glass melt comprises suspending the addition of the sulfate chemical fining agent into the glass melt contained in the interior reaction chamber of the submerged combustion melter.

10. The method set forth in claim 1, wherein, relative to a flow direction through the fining chamber, the fining vessel includes a front skimmer, a rear skimmer, and an intermediate skimmer disposed between the front skimmer and the rear skimmer, the front skimmer and the rear skimmer dividing the fining chamber into a receiving section that receives the inflow of unrefined molten glass into the fining chamber, a delivery section from which an outflow of refined molten glass is drawn out of the fining chamber, and a conditioning section situated between the receiving section and the delivery section, and wherein the temperature indication zone is located in the conditioning section of the fining chamber.

11. The method set forth in claim 1, wherein the temperature of the molten glass bath within the temperature indication zone is determined by a temperature sensor.

12. The method set forth in claim 11, wherein the temperature sensor is a thermocouple that is in direct contact with the subsurface portion of the molten glass bath encompassed by the temperature indication zone.

13. The method set forth in claim 1, wherein the minimum glass fining temperature is determined based on the chemical fining activity of the sulfate chemical fining agent in relation to the temperature of the molten glass bath within the temperature indication zone.

14. The method set forth in claim 1, wherein the minimum glass fining temperature is based on a relationship between chemical fining activity associated with the sulfate chemical fining agent and thermal fining activity associated with the viscosity of the molten glass bath within the temperature indication zone.

15. The method set forth in claim 1, wherein at least some of the amount of the sulfate chemical fining agent added to the glass melt is introduced into the interior reaction chamber through an auxiliary inlet that is separate from a feed material inlet through which the vitrifiable feedstock material is introduced into the interior reaction chamber.

16. The method set forth in claim 1, wherein delivering the inflow of unrefined molten glass into the fining chamber of the fining vessel comprises delivering the inflow of unrefined molten glass directly from a molten glass outlet of the submerged combustion melter into an inlet of the fining vessel.

17. A method of producing and fining glass, the method comprising:
providing a glass melt that is contained within an interior reaction chamber of a submerged combustion melter, the glass melt comprising unrefined molten glass having a soda-lime-silica glass chemical composition that includes 60 wt % to 80 wt % $SiO_2$, 8 wt % to 18 wt % $Na_2O$, and 5 wt % to 15 wt % CaO;
discharging combustion products from one or more submerged burners directly into the glass melt contained within the interior reaction chamber of the submerged combustion melter, the combustion products discharged from the one or more submerged burners agitating the glass melt;
delivering an inflow of unrefined molten glass into a fining chamber of a fining vessel, the fining chamber being defined by a housing, and the inflow of unrefined molten glass, which is drawn from the glass melt in the interior reaction chamber of the submerged combustion melter, merging with a molten glass bath contained within the fining chamber;
monitoring a temperature of the molten glass bath within the fining chamber, wherein the temperature of the molten glass bath is determined within a temperature indication zone that encompasses a subsurface portion of the molten glass bath that lies beneath a surface of the molten glass bath;
controlling an amount of a sulfate chemical fining agent added to the glass melt within the interior reaction chamber of the submerged combustion melter based on a comparison of the temperature of the molten glass bath within the fining chamber against a minimum glass fining temperature; and discharging an outflow of refined molten glass from the fining chamber of the fining vessel, the outflow of refined molten glass having a glass density that is greater than a glass density of the inflow of unrefined molten glass received in the fining chamber of the fining vessel.

18. The method set forth in claim 17, wherein the temperature indication zone rises upwards from a floor of the housing to a distance ranging from 10% to 60% of a depth of the molten glass bath while extending an entire width of the fining chamber and being spaced away from each of an inlet end wall of the housing and an outlet end wall of the housing by a distance ranging from 40% to 60% of a length of the fining chamber.

19. The method set forth in claim 18, wherein, relative to a flow direction through the fining chamber, the fining vessel includes a front skimmer, a rear skimmer, and an intermediate skimmer disposed between the front skimmer and the rear skimmer, the front skimmer and the rear skimmer dividing the fining chamber into a receiving section that receives the inflow of unrefined molten glass into the fining chamber through an inlet defined in the housing, a delivery section from which the outflow of refined molten glass is drawn out of the fining chamber through an outlet defined in the housing, and a conditioning section situated between the receiving section and the delivery section, and wherein the temperature indication zone is located in the conditioning section of the fining chamber.

20. The method set forth in claim 17, wherein the minimum glass fining temperature is between 1220° C. and 1260° C.

21. The method set forth in claim 17, wherein controlling the amount of the sulfate chemical fining agent added to the glass melt comprises:

controlling the amount of the sulfate chemical fining agent added to the glass melt contained in the interior reaction chamber of the submerged combustion melter to provide the unrefined molten glass, upon being discharged from the submerged combustion melter, with a retained sulfate content of at least 0.04 wt %, as expressed as $SO_3$, when the temperature of the molten glass bath in the temperature indication zone is less than the minimum glass fining temperature.

22. The method set forth in claim 17, wherein controlling the amount of the sulfate chemical fining agent added to the glass melt comprises:

controlling the amount of the sulfate chemical fining agent added to the glass melt contained in the interior reaction chamber of the submerged combustion melter to provide the unrefined molten glass, upon being discharged from the submerged combustion melter, with a retained sulfate content of between 0 wt % and less than 0.04 wt %, as expressed as $SO_3$, when the temperature of the molten glass bath in the temperature indication zone is equal to or greater than the minimum glass fining temperature.

23. The method set forth in claim 17, further comprising: introducing a vitrifiable feedstock material into the glass melt contained within the interior reaction chamber of the submerged combustion melter through a feed material inlet, the vitrifiable feedstock material comprising glass-forming materials that melt-react into the glass melt, and wherein at least some of the amount of the sulfate chemical fining agent added to the glass melt is introduced into the interior reaction chamber through an auxiliary inlet that is separate from the feed material inlet.

24. The method set forth in claim 17, wherein delivering the inflow of unrefined molten glass into the fining chamber of the fining vessel comprises delivering the inflow of unrefined molten glass directly from a molten glass outlet of the submerged combustion melter into an inlet of the fining vessel.

25. A method of producing and fining glass, the method comprising:

producing a glass melt in an interior reaction chamber of a submerged combustion melter, the glass melt comprising unrefined molten glass having a soda-lime-silica glass chemical composition;

discharging combustion products from one or more submerged burners directly into the glass melt contained within the interior reaction chamber of the submerged combustion melter;

delivering an inflow of unrefined molten glass from the glass melt and into a fining chamber of a fining vessel, the inflow of unrefined molten glass merging with a molten glass bath contained within the fining chamber;

monitoring a temperature of the molten glass bath within the fining chamber in a temperature indication zone of the molten glass bath that encompasses a subsurface portion of the molten glass bath;

comparing the temperature of the molten glass bath in the temperature indication zone against a minimum glass fining temperature, wherein the minimum glass fining temperature is between 1220° C. and 1260° C.; and controlling an amount of a sulfate chemical fining agent added to the glass melt in the interior reaction chamber of the submerged combustion melter based on the comparison of the temperature of the molten glass bath in the temperature indication zone against the minimum glass fining temperature such that the unrefined molten glass of the glass melt, upon being discharged from the interior reaction chamber of the submerged combustion melter, is provided with a retained sulfate content, as expressed as $SO_3$, of (i) between 0 wt % and less than 0.04 wt % when the temperature of the molten glass bath in the temperature indication zone is equal to or greater than the minimum glass fining temperature and (ii) at least 0.04 wt % when the temperature of the molten glass bath in the temperature indication zone is less than the minimum glass fining temperature.

26. The method set forth in claim 25, wherein delivering the inflow of unrefined molten glass from the glass melt and into the fining chamber of the fining vessel comprises delivering the inflow of unrefined molten glass directly from a molten glass outlet of the submerged combustion melter into an inlet of the fining vessel.

27. The method set forth in claim 25, wherein, relative to a flow direction through the fining chamber, the fining vessel includes a front skimmer, a rear skimmer, and an intermediate skimmer disposed between the front skimmer and the rear skimmer, each of the front skimmer, the rear skimmer, and the intermediate skimmer extending downwards from a roof of a housing of the fining vessel towards a floor of the housing of the fining vessel, the front skimmer and the rear skimmer dividing the fining chamber into a receiving section that receives the inflow of unrefined molten glass into the fining chamber through an inlet, a delivery section from which an outflow of refined molten glass is drawn out of the fining chamber through an outlet, and a conditioning section situated between the receiving section and the delivery section, and wherein the temperature indication zone is located in the conditioning section of the fining chamber.

28. The method set forth in claim 27, wherein the temperature indication zone extends upwards from the floor of the housing of the fining vessel to a distance ranging from 10% to 60% of a depth of the molten glass bath while extending an entire width of the fining chamber.

29. The method set forth in claim 25, further comprising:
introducing a vitrifiable feedstock material into the glass melt contained within the interior reaction chamber of the submerged combustion melter through a feed material inlet, the vitrifiable feedstock material comprising glass-forming materials that melt-react into the glass melt.

30. The method set forth in claim 29, wherein the sulfate chemical fining agent added to the glass melt is introduced into the interior reaction chamber as part of the vitrifiable feedstock material.

31. The method set forth in claim 29, wherein at least some of the amount of the sulfate chemical fining agent added to the glass melt is introduced into the interior reaction chamber through an auxiliary inlet that is separate from a feed material inlet through which the vitrifiable feedstock material is introduced into the interior reaction chamber.

32. A method of producing and fining glass, the method comprising:
producing a glass melt in an interior reaction chamber of a submerged combustion melter, the glass melt comprising unrefined molten glass;
adding a sulfate chemical fining agent to the glass melt in the interior reaction chamber of the submerged combustion melter;
discharging combustion products from one or more submerged burners directly into the glass melt contained within the interior reaction chamber of the submerged combustion melter;
delivering an inflow of unrefined molten glass from the glass melt and into a fining chamber of a fining vessel, the inflow of unrefined molten glass merging with a molten glass bath contained within the fining chamber;
monitoring a temperature of the molten glass bath within the fining chamber in a temperature indication zone of the molten glass bath that encompasses a subsurface portion of the molten glass bath;
comparing the temperature of the molten glass bath in the temperature indication zone against a minimum glass fining temperature; and
limiting or suspending an amount of the sulfate chemical fining agent added to the glass melt when the temperature of the molten glass bath in the temperature indication zone is equal to or greater than the minimum glass fining temperature.

33. The method set forth in claim 32, further comprising:
introducing a vitrifiable feedstock material into the glass melt contained within the interior reaction chamber of the submerged combustion melter through a feed material inlet, the vitrifiable feedstock material comprising glass-forming materials that melt-react into the glass melt.

34. The method set forth in claim 33, wherein the sulfate chemical fining agent added to the glass melt is introduced into the interior reaction chamber as part of the vitrifiable feedstock material.

35. The method set forth in claim 33, wherein at least some of the amount of the sulfate chemical fining agent added to the glass melt is introduced into the interior reaction chamber through an auxiliary inlet that is separate from the feed material inlet through which the vitrifiable feedstock material is introduced into the interior reaction chamber.

36. The method set forth in claim 32, wherein delivering the inflow of unrefined molten glass from the glass melt and into the fining chamber of the fining vessel comprises delivering the inflow of unrefined molten glass directly from a molten glass outlet of the submerged combustion melter into an inlet of the fining vessel.

37. The method set forth in claim 32, wherein the minimum glass fining temperature is determined based on the chemical fining activity of the sulfate chemical fining agent in relation to the temperature of the molten glass bath within the temperature indication zone.

38. The method set forth in claim 32, wherein, relative to a flow direction through the fining chamber, the fining vessel includes a front skimmer, a rear skimmer, and an intermediate skimmer disposed between the front skimmer and the rear skimmer, each of the front skimmer, the rear skimmer, and the intermediate skimmer extending downwards from a roof of a housing of the fining vessel towards a floor of the housing of the fining vessel, the front skimmer and the rear skimmer dividing the fining chamber into a receiving section that receives the inflow of unrefined molten glass into the fining chamber through an inlet, a delivery section from which an outflow of refined molten glass is drawn out of the fining chamber through an outlet, and a conditioning section situated between the receiving section and the delivery section, and wherein the temperature indication zone is located in the conditioning section of the fining chamber.

39. The method set forth in claim 38, wherein the temperature indication zone extends upwards from the floor of the housing of the fining vessel to a distance ranging from 10% to 60% of a depth of the molten glass bath while extending an entire width of the fining chamber.

40. A method of producing and fining glass, the method comprising:
producing a glass melt in an interior reaction chamber of a submerged combustion melter, the glass melt comprising unrefined molten glass;
discharging combustion products from one or more submerged burners directly into the glass melt contained within the interior reaction chamber of the submerged combustion melter;
delivering an inflow of unrefined molten glass, which is drawn and originates from the glass melt contained the interior reaction chamber of the submerged combustion melter, into a fining chamber of a fining vessel, the inflow of unrefined molten glass merging with a molten glass bath contained within the fining chamber;
monitoring a temperature of the molten glass bath within the fining chamber in a temperature indication zone of the molten glass bath that encompasses a subsurface portion of the molten glass bath, the temperature indication zone extending upwards from a floor of a housing of the fining vessel to a distance ranging from 10% to 60% of a depth of the molten glass bath while extending an entire width of the fining chamber and being spaced away from each of an inlet end wall of the housing and an outlet end wall of the housing by a distance ranging from 40% to 60% of a length of the fining chamber;
comparing the temperature of the molten glass bath in the temperature indication zone against a minimum glass fining temperature, the minimum glass fining temperature being determined based on the chemical fining activity of the sulfate chemical fining agent in relation to the temperature of the molten glass bath within the temperature indication zone; and controlling an amount of a sulfate chemical fining agent added to the glass melt in the interior reaction chamber of the submerged combustion melter based on the comparison of the temperature of the molten glass bath in the temperature indication zone against the minimum glass fining temperature.

41. The method set forth in claim 40, wherein the minimum glass fining temperature is between 1220° C. and 1260° C.

42. The method set forth in claim 41, wherein delivering the inflow of unrefined molten glass into the fining chamber of the fining vessel comprises delivering the inflow of unrefined molten glass directly from a molten glass outlet of the submerged combustion melter into an inlet of the fining vessel.

43. The method set forth in claim 40, wherein, relative to a flow direction through the fining chamber, the fining vessel includes a front skimmer, a rear skimmer, and an intermediate skimmer disposed between the front skimmer and the rear skimmer, each of the front skimmer, the rear skimmer, and the intermediate skimmer extending downwards from a roof of the housing of the fining vessel towards the floor of the housing of the fining vessel, the front skimmer and the rear skimmer dividing the fining chamber into a receiving section that receives the inflow of unrefined molten glass into the fining chamber through an inlet, a delivery section from which an outflow of refined molten glass is drawn out of the fining chamber through an outlet, and a conditioning section situated between the receiving section and the delivery section, and wherein the temperature indication zone is located in the conditioning section of the fining chamber.

44. The method set forth in claim 40, wherein controlling the amount of a sulfate chemical fining agent added to the glass melt comprises:

adding the sulfate chemical fining agent to the glass melt in the interior reaction chamber of the submerged combustion melter when the temperature of the molten glass bath in the temperature indication zone is less than the minimum glass fining temperature such that the unrefined molten glass of the glass melt, upon being discharged from the interior reaction chamber of the submerged combustion melter, is provided with a retained sulfate content, as expressed as $SO_3$, of at least 0.04 wt %; and limiting or suspending the amount of the sulfate chemical fining agent added to the glass melt when the temperature of the molten glass bath in the temperature indication zone is equal to or greater than the minimum glass fining temperature such that the unrefined molten glass of the glass melt, upon being discharged from the interior reaction chamber of the submerged combustion melter, is provided with a retained sulfate content, as expressed as $SO_3$, of between 0 wt % and less than 0.04 wt %.

* * * * *